United States Patent [19]
Chang et al.

[11] Patent Number: 5,225,252
[45] Date of Patent: Jul. 6, 1993

[54] GLASS VACUUM FLASK COATING METHOD

[76] Inventors: Ming-Wen Chang, 6th Floor, No. 11, Lane 52, Wen Chou Street, Taipei; Yu-Cheng Chuang, 19 Pu Jen 1 Village, Lane 443, Chung shan E Road, Sec. 2, Chung Li, both of Taiwan

[21] Appl. No.: 824,627

[22] Filed: Jan. 23, 1992

[51] Int. Cl.⁵ ............................................. B05D 3/02
[52] U.S. Cl. ................................... 427/561; 65/32.4; 65/34; 65/42; 65/43; 65/55; 65/60.4; 65/117; 427/166; 427/229; 427/237; 427/238; 427/239; 427/250; 427/255; 427/294; 427/295; 427/350; 427/383.5; 427/383.7; 427/591; 427/598

[58] Field of Search .................... 65/32.4, 34, 42, 43, 65/55, 60.4, 117; 427/166, 229, 237, 238, 239, 250, 255, 294, 295, 350, 383.5, 383.7, 591, 598, 561

Primary Examiner—Bernard Pianalto
Attorney, Agent, or Firm—Lowe, Price, LeBlanc & Becker

[57] ABSTRACT

A glass vacuum flask coating method comprising a step to put a metal material in the gap between an inner flask and an outer flask before said inner and outer flasks being formed into a blank for a glass vacuum flask, after the process of exhausting and tipping-off said metal material being heated by a magnetic field generated from an inductance coil into a metal vapor inside said gap, permitting said metal vapor to be adhered to the glass surface inside said gap, forming into a metal reflecting film thereon.

7 Claims, 4 Drawing Sheets

GLASS VACUUM FLASK COATING METHOD

BACKGROUND OF THE INVENTION

1. Field of the Invention

The present invention relates to a coating method for a glass vacuum flask and the devices for performing such a coating method, which is easy and inexpensive to perform and does not produce pollution.

2. Description of the Prior Art

The vacuum flask may be made from glass or metal material. The glass vacuum flask consists of an inner flask and an outer flask. The inner and outer flasks are incorporated into a double-layer container with a gap defined therebetween. The outer surface of the inner flask and the inner surface of the outer flask are respectively coated with a layer of silver and incorporated with each other into a unitary reflecting surface. After coating, the air in the gap between the inner and outer flasks is exhausted, and therefore, the gap is formed into a vacuum chamber. Because glass material provides low heat conductivity, the reflecting surface can reflect radiation of heat, and the vacuum chamber can reduce the effect of heat conviction to the minimum. Therefore, a glass vacuum flask of this kind can be used for keeping liquids hot (or cold) for a long time.

FIG. 1 is a flow chart of the prior art glass vacuum flask manufacturing process. A blank for inner flask ($A_0$) is obtained through the process of blowing (Step I). The blank for inner flask ($A_0$) is treated through cutting and flaring processes to form into an inner flask (A) by cutting off the cullet ($A_2$) thereof and forming a flare ($A_1$) thereof, and then, the bottom of the inner flask (A) is adhered with an asbestos cushion ($A_3$) (Step II). During the formation of the inner flask (A), a blank for outer flask ($B_0$) is obtained through the process of blowing (Step III) and then, treated through tubulating process (Step IV). During the tubulating process (Step IV), a glass tube ($B_1$) is welded to the bottom edge of the blank of the outer flask ($B_0$) to connect the inner space between the blanks with outer space. The blank for outer flask ($B_0$) is covered over the inner flask (A) and treated by rollers (not shown) through heat rolling process to shrink into a shape to fit the inner flask (A) (see the dotted line in Step V), and then, the cullet ($B_2$) of the blank of outer flask ($B_0$) is cut off, and therefore, an outer flask (B) is formed with the inner flask (A) maintained therein. The openings of the inner flask (A) and the outer flask (B) are then sealed through the process of neck sealing annealing (Step VI). Then, tin dichloride solution is filled through the glass tube ($B_1$) into the gap (G) between the inner and outer flasks (A, B) to activate the glass surface for further silvering process (Step VII). During silvering process, silver nitrate solution and formalin or suitable reducing agent are filled into the gap (G) to form a silver coating over the glass surface inside the gap (G). After washing, the silver coated flask is treated through stoving process (Step VIII) to remove moisture from the silvering process. The flask is further treated through exhausting process to a vacuum status below $1 \times 10^{-3}$ Torr and then treated through tipping off process (Step IX). After Step IX, the flask is then treated through temperature testing (Step X). After approval through temperature testing, a flask is finished.

The aforesaid prior art of vacuum flask manufacturing process is complicated to achieve. The materials used for silver coating are expensive. The use of tin dichloride, silver nitrate and reducing agent will produce poisonous waste water which may cause serious environmental pollution. In order to treat the waste water from the manufacturing process, expensive waste water treating equipment shall be required. Further, any residual silver solution in the gap between the inner and outer flasks may affect the performance of vacuum process. In addition to the aforesaid disadvantages, the aforesaid prior art of vacuum flask manufacturing process requires experienced workers to operate. Since only experienced workers can do the job, the manufacturing cost of a glass vacuum flask according to the aforesaid process is therefore increased.

SUMMARY OF THE INVENTION

The present invention has been accomplished to eliminate the aforesaid disadvantages. It is therefore an object of the present invention to provide a glass vacuum flask coating method which does not produce waste water pollution problem.

It is another object of the present invention to provide a glass vacuum flask coating method which utilizes simple and inexpensive devices to perform the process.

It is still another object of the present invention to provide a glass vacuum flask coating method which is easy to achieve.

To achieve the aforesaid objects, there is provided a glass vacuum flask coating method to coat a metal film, of selected material such as Ag, Ni, Al or any of a variety of metal or non-metal materials which are practical for vacuum-deposit process. During vacuum-deposit process, the glass vacuum flask is placed in an inductance coil which produces an eddy current to raise temperature to evaporate the coating material. The metal vapor will soon be adhered to the glass surface inside the gap between the inner and outer flasks, so as to form a reflecting film thereon. The coating material can be made in powder and mixed with a vehicle. The mixture is then coated over the outer surface of the inner flask and/or on the inner surface of the outer flask. After drying, only metal powder is left on the inner flask and/or on the inner surface of the outer flask. If a metal sheet is used as a metal material for vacuum-deposit process, it is directly inserted in the gap between the inner and outer flasks for further treatment through the process of vacuum-deposit coating.

DETAILED DESCRIPTION OF THE INVENTION

Figure 2:
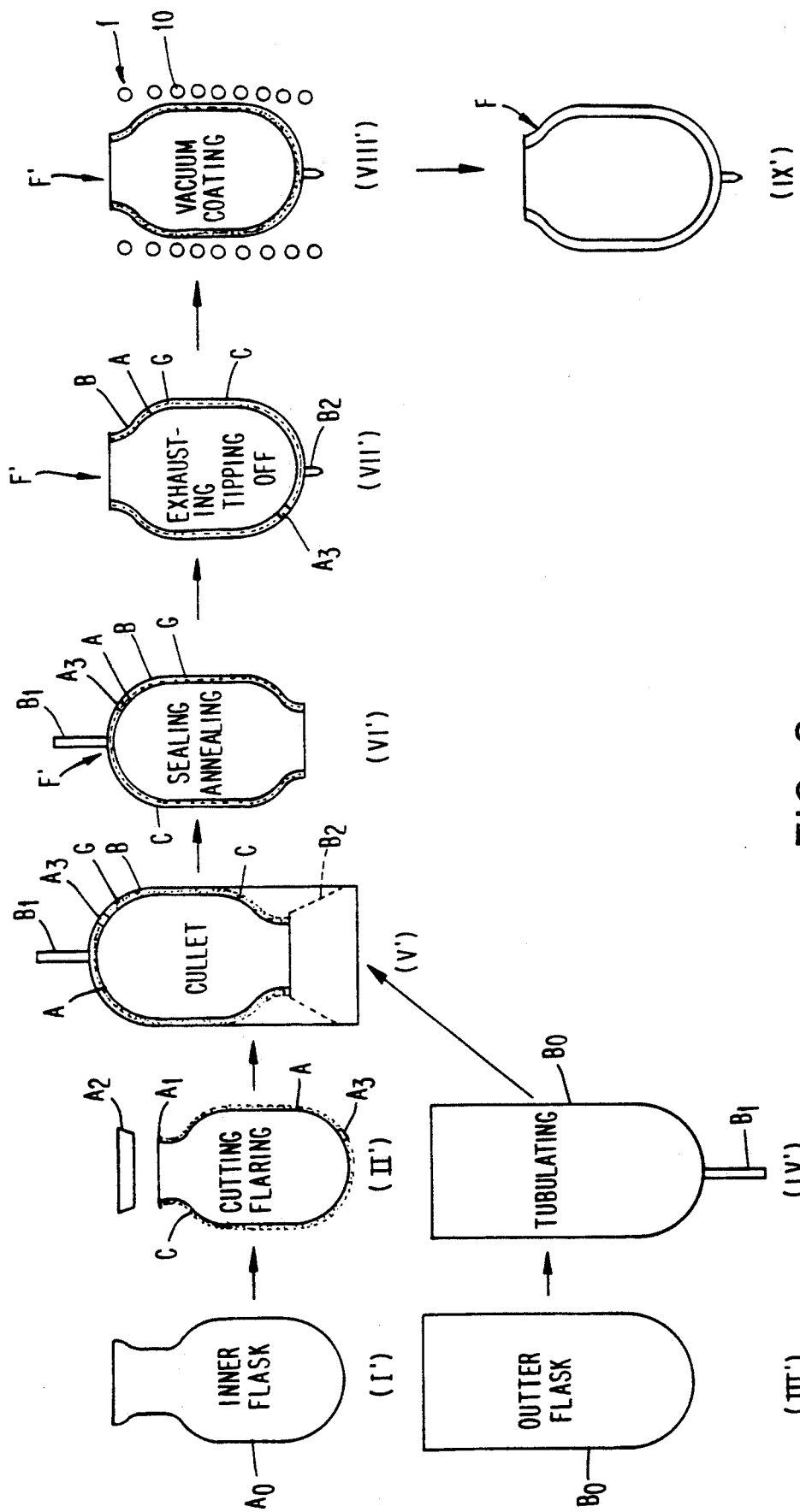
FIG. 2 is a glass vacuum flask production flow chart according to the present invention.
Figure 3A:
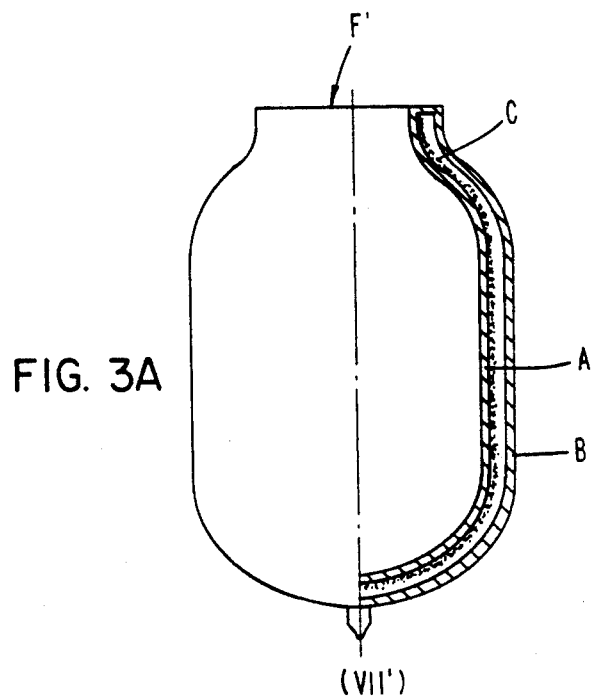
FIGS. 3A, 3B and 3C are sectional views taken on Step VII' and VIII' of FIG. 2, showing the change of metal material during vacuum-deposit process.
Figure 3C:
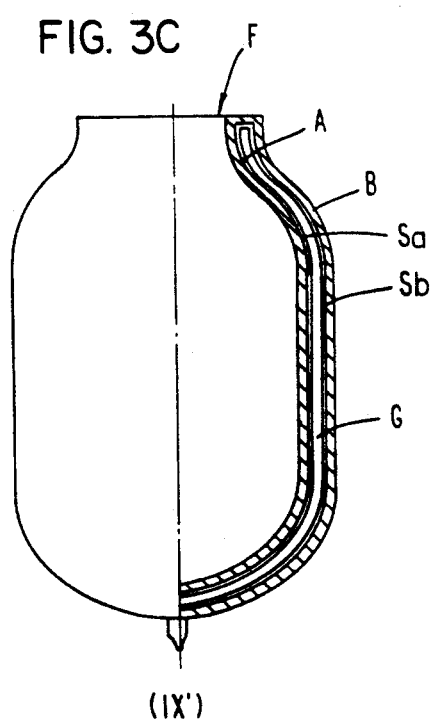
Figure 3B:
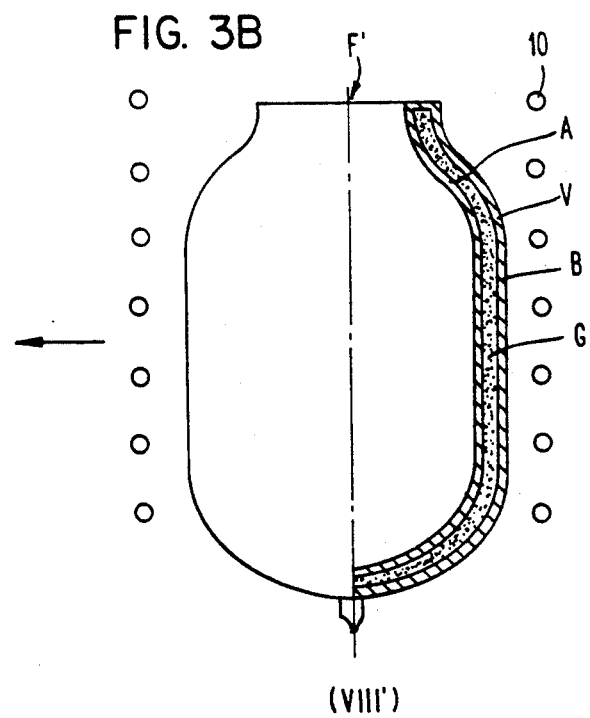

Referring to FIG. 2, a glass vacuum flask coating method according to the present invention also includes inner flask formation process (Step I'); cutting, flaring and asbestos sticking processes (Step II'); outer flask formation process (Step III'); tubulating process (Step IV'); cullet process (Step V'); and sealing and annealing processes (Step VI'). Except the coating of metal powder C on the outer surface of the inner flask A and/or on the inner surface of the outer flask in Step II, the other procedures are the same as performed in the prior art glass vacuum flask manufacturing process and will not be described further. In the following description, same elements are designated by same codes.

In Step II', the metal powder which is used to coat the outer surface of the inner flask A and/or the inner surface of the outer flask is selected from Ag, Ni, Al, Cr, Li, Pb, Sn, or any of a variety of metal materials which are suitable for vacuum-depositing. There is no critical limitation on the particle size of the metal powder to be used. Any size may be acceptable if the metal powder can be tightly adhered to the outer surface of the inner flask and/or to the inner surface of the outer flask. The amount of the metal powder to be used is determined according to the thickness of the coating desired. For example, if the metal powder is selected from Ag (silver), the coating on the glass surface of the inner or outer flask shall be approximately 0.023 g/cm$^2$ and the thickness of which shall be approximately within $3.05 \times 10^{-6}$ to $2.00 \times 10^{-5}$ cm. In order to obtain higher adhesion force, the metal powder is mixed with a vehicle at a ratio of 700 gr of metal powder: 300 ml of vehicle. The vehicle is simply used to increase the adhesion force of the metal powder and does not produce any side effects. Therefore, the ratio of the vehicle to be mixed is not so critical. The vehicle to be used may contain drying oil, thinner and dryer.

Figure 1:
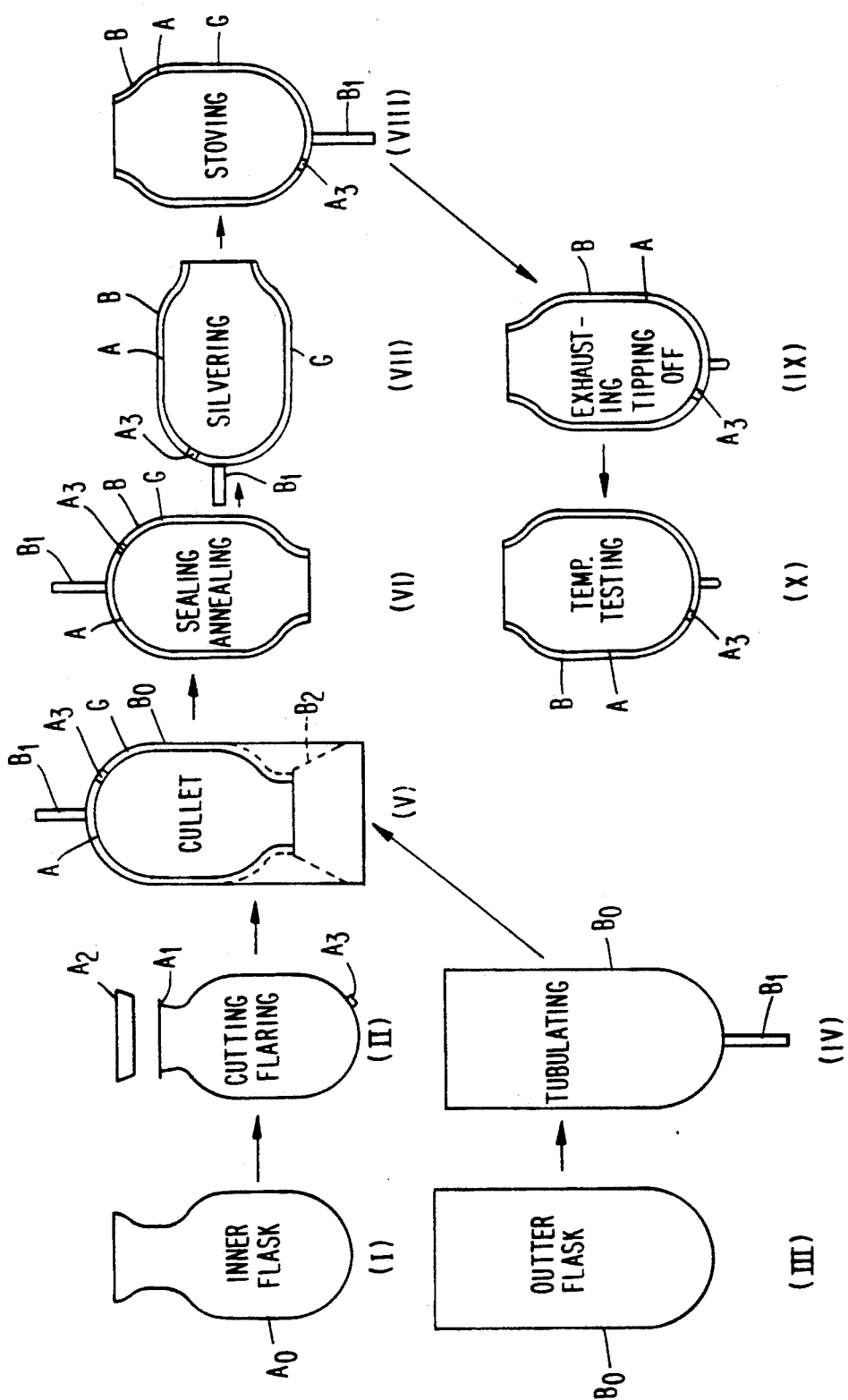
FIG. 1 is a prior art glass vacuum flask production flow chart.

The blank flask F' which is obtained from the aforesaid Step I' through Step VI' is treated through exhausting and tipping off process (Step VII') so as to obtain a vacuum expectation value of $1 \times 10^{-3}$ Torr in the gap G' between the inner flask A and the outer flask B. This procedure has no difference from the prior are Step IX (of FIG. 1). However, since no silver solution or moisture is left, expected vacuum value can be easily achieved according to the present invention.

Figure 4:
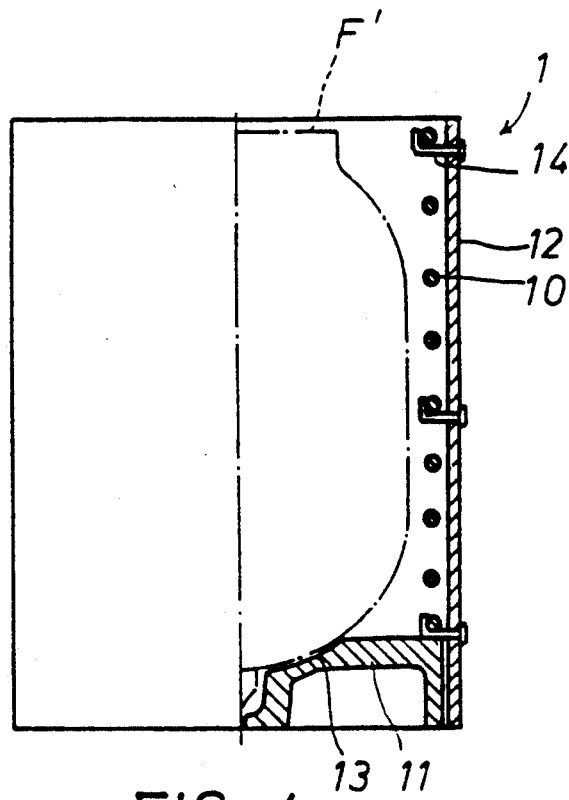
FIG. 4 is a sectional view of a vacuum deposit device according to the present invention.
Figure 5:
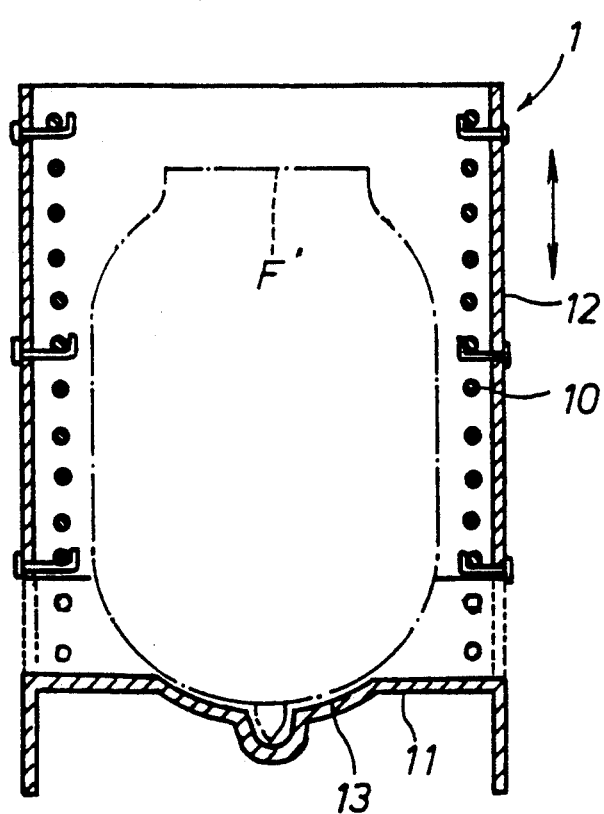
FIG. 5 is an alternate form of the vacuum deposit device according to the present invention.

The blank flask F' thus obtained from Step VII' is placed in a vacuum-deposit device 1, which mainly comprises of an inductance coil 10, for vacuum plating treatment (step VIII'). This step is the point of emphasis. As illustrated in FIG. 4, the vacuum-deposit device 1 comprises a spiral inductance coil 10 on a base 11, which is surrounded by an insulator sleeve 12 and retained in place by a plurality of fastening elements 14. The base 11 is made from heat-resisting ceramic material, having a recess 13 for holding the blank flask F' in a vertical position. The insulator sleeve 12 has a bottom end covered over the peripheral surface of the base 11. The inner diameter of the inductance coil 10 is sufficient for holding the blank flask F' in a vertical position. The inductance coil 10 is connected to an external AC power supply (this is of the known technique and not shown in the drawings). FIG. 5 illustrates an alternate form of the vacuum-deposit device. In this alternate form, same component parts are used, and the insulator sleeve 12 is movably mounted on the base 11. When in use, the insulator sleeve 12 is lifted for putting the blank flask F' on the base 11. Then, the insulator sleeve 12 is put back permitting the blank flask F' to be held in the inductance coil 10.

The process of vacuum-depositing (Step VIII') is to put a blank flask F', of which the outer surface of the inner flask A and/or the inner surface of the outer flask is covered with metal powder C, in the inductance coil 10 of a vacuum-deposit device 1 with the bottom edge of the blank flask F' inserted in the recess 13 on the base 11 of the vacuum-deposit device 1. Then, external AC power supply is connected to the inductance coil 10 causing it to produce an eddy current in the metal powder C. Therefore, the temperature is increased to evaporate the metal powder C into a metal vapor V. The metal vapor V immediately fills in the gap G in the blank flask F'. Because the temperature at the glass of the blank flask F' is far below the temperature of the metal vapor V, the metal vapor V immediately deposits to the outer surface of the inner flask A and the inner surface of the outer flask B, namely, the glass surface inside the gap G, upon contact, and therefore it forms two unitary silver reflecting films Sa, Sb thereon. Thus, the blank flask F' is formed into a vacuum flask F. In the aforesaid process, the temperature of the metal vapor V is about 1319° C. for Ag; about 1700° C. for Ni; about 1400° C. for Al and the temperature difference relative to the blank flask F' is about 200° C., and therefore, the atoms of the metal vapor V can be easily deposited to the glass surface. The thickness of the silver reflecting films Sa, Sb is approximately 3.05 to $20.32 \times 10^{-6}$ cm. Because the metal powder C is under a vacuum status, it can be evaporated within a short time.

As indicated, the metal powder which is used for plating on the blank flask F' through the process of vacuum-depositing is mixed with a vehicle and then covered over the outer surface of the inner flask A and/or the inner surface of the outer flask B thereof. The mixture may be coated over the whole area or part of the outer surface of the inner flask A and/or the inner surface of the outer flask B. The coating area of the mixture of the metal powder and the vehicle is determined according to coating thickness.

Further, instead of the use of metal powder, a thin metal sheet may be inserted in the gap G during the insertion of the inner flask A in the outer flask B at Step V' so as to accelerate the coating method. When a metal sheet is used, the evaporating time is shortened, the other procedures through Step V' to Step IX' remain unchanged.

Following is an experimental example showing the feasibility of the present invention.

EXPERIMENTAL EXAMPLE

Prepare a blank flask, according to the procedure illustrated in FIG. 2, of specified capacity 1 liter, caliber about 40 mm, outer diameter about 115 mm and height about 180 mm, and in a shape similar to that indicated in FIG. 2. Prepare a mixture by mixing 700 gr. silver powder with 300 ml. vehicle during Step II' and then, coat the mixture thus obtained over the outer surface of the inner flask and/or the inner surface of the outer flask. As soon as the coating of the mixture is dried, proceed with culleting (Step V'), sealing and annealing (Step VI'), exhausting and tipping off (Step VII') to obtain a vacuum value of approximately $10^{-3}$ Torr. After tipping off process, the blank flask thus obtained is put in an inductance coil of inner diameter 125 mm and 18 turns (see FIG. 4), and treated by a 5 MHz of high radio frequency current. 6 seconds after treatment, the silver powder in the coating is melted and heated to 1200° C., and then, it is instantly evaporated and adhere to the glass surface in the gap inside the blank flask. Then, cut off power supply and check the silver reflecting surfaces on the inner and outer flasks through visual inspection. After passing through temperature testing process, a finished glass vacuum flask is approved.

As indicated, the present invention provides several advantages as outlined hereinafter.

1) Since only metal powder, metal sheet and vehicle are used for forming a silver reflecting surface on the inner and outer flasks without any chemicals, no waste water is produced, and therefore, no pollution made.

2) Because metal material is evaporated into vapor under vacuum status, evaporating process is performed quickly. Because the metal material becomes active and contains no impurities once evaporated, it will uniformly and tightly adhere to the glass surface forming into a high quality reflecting surface.

3) The vacuum-deposit processing procedure is easy to perform simply by coating metal powder and vehicle mixture over the surface of the inner flask and/or on the inner surface of the outer flask or putting a metal sheet or wire in the gap between the inner and outer flask, and then, connecting an electric power supply to a vacuum-deposit device after the disposing of the coated blank flask therein.

4) The vacuum-deposit device to be used is simply comprised of an inductance coil and a power supply control.

5) According to the aforesaid advantages of 1) through 4), the present invention is easy to perform, the cost of a finished product is less expensive, and high quality glass vacuum flask can be achieved according to the present invention.

6) Because inductance coil is used to produce an eddy current for evaporating the metal material in the gap, any of a variety of metal materials which are practical for vapor deposit can be used in the present invention.

7) Because the reflecting film formed on the glass surface through the vacuum-deposit process is active, it works like a gas getter to absorb the gas in the gap inside the blank flask so that a vacuum value to $1 \times 10^{-4}$ Torr is achieved without the use of any diffusion pump. This vacuum value ensures high effect in keeping liquids hot (or cold).

What is claimed is:

1. A glass vacuum flask coating method, comprising
    cullet cutting and flaring the inner glass flask blank to prepare the inner flask,
    tubulating the outer glass flask blank to prepare the outer flask,
    mounting the outer flask over the inner flask with a gap maintained therebetween and treating them to form an integral flask with the process of culleting, sealing, annealing, exhausting and tipping-off, and characterized in further comprising
    placing a metal material for vacuum depositing in the gap between the inner and outer flasks when the outer flask is mounted over the inner flask,
    vaporizing the metal material by placing, after exhausting and tipping-off, the flask in a magnetic field to cause an eddy current in the metal and thereby heating the metal to form vapor inside the gap, permitting the metal vapor to be adhered to the glass surface inside the gap, forming into a metal reflecting film.

2. The flask coating method as set forth in claim 1, wherein the metal material being any one selected from the group of Ag, Ni, Al, Cr, Au, Pb, Li and Sn.

3. The flask coating method of claim 1, wherein said metal material is a metal powder and coated over the outer surface of said inner flask and/or on the inner surface of the outer flask.

4. The flask coating method of claim 3, wherein said metal powder is mixed with a vehicle into a viscous fluid or solution and coated over the outer surface of said inner flask and/or on the inner surface of the outer flask.

5. The flask coating method of claim 1, wherein said metal material is a metal sheet placed in said gap between said inner and outer flasks.

6. The flask coating method of claim 1, wherein said blank which has said metal material placed in said gap between said inner and outer flasks is disposed in said inductance coil.

7. The flask coating method of claim 1, wherein said blank is exhausted into a vacuum of $1 \times 10^{-3}$ Torr and then treated through the process of tipping off.

* * * * *